United States Patent Office 3,507,894
Patented Apr. 21, 1970

3,507,894
NOVEL AMIDES OF 1,2,3,4-CYCLOPENTANE-
TETRACARBOXYLIC ACID AND METAL
COMPLEXES THEREOF
Ross Van Volkenburgh, Baton Rouge, La., assignor to
Copolymer Rubber & Chemical Corporation, Baton
Rouge, La., a corporation of Louisiana
No Drawing. Continuation-in-part of application Ser. No.
302,482, Aug. 15, 1963. This application July 17, 1967,
Ser. No. 653,671
Int. Cl. C07j 15/06; C07c 103/00, 61/06
U.S. Cl. 260—439
5 Claims

ABSTRACT OF THE DISCLOSURE

Hydrocarbyl amides of 1,2,3,4-cyclopentanetetracarboxylic acid and metal complexes thereof, as exemplified by the tetra-(dimethylamide) of 1,2,3,4-cyclopentanetetracarboxylic acid and the complex thereof with cobalt. The polyamide may be used as a solvent, plasticizer, complexing agent for heavy metals, etc. The complex may be used as catalyst, drying agent, etc.

CROSS-REFERENCE TO RELATED APPLICATIONS

This is a continuation-in-part of application Ser. No. 302,482, filed Aug. 15, 1963 now abandoned.

DESCRIPTION OF THE INVENTION

This invention relates to novel tetraamide derivatives of 1,2,3,4-cyclopentanetetracarboxylic acid and complexes thereof. In some of its more specific aspects, the invention further relates to the tetra(dimethylamide) of cis, cis, cis, cis-1,2,3,4-cyclopentanetetracarboxylic acid and metal complexes thereof.

1,2,3,4-cyclopentanetetracarboxylic acid has been prepared heretofore and its methyl and ethyl esters are known. However, derivatives such as the tetraamide and substituted tetraamides have not ben prepared and thus their properties are unknown.

It is an object of the present invention to provide novel tetraamides of 1,2,3,4-cyclopentanetetracarboxylic acid.

It is a further object of the invention to provide novel tetra(dialkylamides) of 1,2,3,4-cycyopentanetetracarboxylic acid.

It is still a further object of the invention to provide the tetra(dimethylamide) of 1,2,3,4-cyclopentanetetracarboxylic acid.

It is still a further object of the invention to provide complexes, and especially heavy metal complexes such as the cobalt complex, of the foregoing tetraamide derivatives of 1,2,3,4-cyclopentanetetracarboxylic acid.

It is still a further object of the invention to provide the foregoing tetraamide derivatives of the cis, cis, cis, cis-stereoisomer of 1,2,3,4 - cyclopentanetetracarboxylic acid and complexes thereof.

Still other objects and advantages of the invention will be apparent to those skilled in the art upon reference to the following detailed description and the examples. In accordance with one important variant of the present invention, novel chemical compounds are provided having the formula:

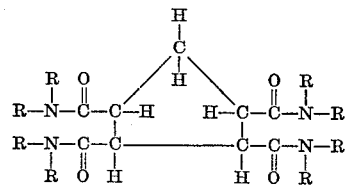

wherein R is at least one substituent selected from the group consisting of hydrogen and monovalent organic radicals. Additionally, simple derivatives of the foregoing compounds may be prepared and it is understood that they are also encompassed within the present invention.

The monovalent organic radicals in the above-mentioned formula may include, for example, alkyl, cycloalkyl or alkyl substituted cycloalkyl groups containing 1–20 and preferably 1–8 carbon atoms, or aryl and alkylaryl groups containing 6–20 or more carbon atoms. Specific examples of monovalent organic radicals include methyl, ethyl, propyl, isopropyl, butyl, isobutyl, amyl, isoamyl, hexyl, isohexyl, heptyl, octyl and isooctyl radicals. It is understood that simple derivatives of the foregoing tetraamides may be prepared and that one or more of the substituents mentioned above or otherwise present may be replaced with halogen, alkali metal, etc., following prior art procedures.

In a particularily preferred embodiment R in the above formula is alkyl of 1–20 carbon atoms, cycloalkyl of 3–20 carbon atoms, alkylcycloalkyl in which said alkyl contains 1–20 carbon atoms, aryl, or alkylaryl in which said alkyl contains 1–20 carbon atoms.

Where R in the above formula is cycloalkyl, it preferably comprises cyclohexyl. Other cycloalkyl groups include cyclopropyl, cyclobutyl, cyclopentyl, cycloheptyl, cyclooctyl, cyclononyl, cyclodecyl, cycloundecyl, cyclododecyl, etc. Where R is aryl, it preferably comprises phenyl, although it may comprise naphthyl, anthracyl, etc.

The above novel compounds may be prepared by a number of satisfactory methods known to produce amide derivatives of carboxylic acids. In most instances, it is preferred to first prepare a lower alkyl ester of 1,2,3,4-cyclopentanetetracarboxylic acid, such as the methyl or ethyl ester, and then react the resulting tetraester in an autoclave with four moles of ammonia and/or selected mono- or di-substituted amines to produce the desired tetraamide derivative. For instance, the ester may be reacted with dimethylamine or dimethylformamide to thereby produce the tetra(dimethylamide) derivative. It is understood that a wide variety of tetraamide derivatives may be prepared such as the unsubstituted tetraamide, substituted tetraamides, and mixed tetraamides.

Any of the various stereoisomers of 1,2,3,4-cyclopentanetetracarboxylic acid may be employed in practicing the present invention. However, it is often preferred to use the cis, cis, cis, cis,- stereoisomer which is readily available by nitric acid oxidation of the Diels-Alder adduct of cyclopentadiene and maleic anhydride.

It has been further discovered that the tetraamide derivatives of 1,2,3,4-cyclopentanetetracarboxylic acid described herein, such as the tetra(dimethylamide) derivative, form complexes with numerous substances including iodine and metal ions. The resulting novel complexes are a further important variant of the present invention.

In accordance with still another variant of the invention, it has been discovered that it is possible to separate a cobalt salt from mixtures of the divalent salts of cobalt, chromium and nickel when employing a suitable tetraamide derivative of 1,2,3,4-cyclopentanetetracarboxylic acid under certain conditions. For instance, a solid mixture of the halides of divalent cobalt, nickel and chromium may be contacted with the liquid tetra (dimethylamide) of 1,2,3,4-cyclopentanetetracarboxylic acid to dissolve the cobaltous halide and produce a liquid cobalt complex which is then separated from the insoluble nickelous and chromous halides. The resultant cobalt complex may be destroyed and the free tetraamide dissolved simultaneously by treatment with a suitable solvent, such as chloroform or other inert organic halides, and the insoluble cobaltous halide remains behind as a precipitate. The solution of the free tetraamide is then separated from the insoluble cobaltous halide to thereby produce a purified cobaltous halide which is substantially free of nickelous and chromous halides. The solvent may be separated from the tetraamide by distillation and the free tetraamide recycled in the process to separate additional cobaltous halide.

In some instances, it may also be possible to prepare and use a solution of the tetraamide when separating the above-mentioned cobaltous, nickelous, and chromous halides in a solvent which does not adversely affect the process. The solvent should be one in which the resultant cobalt complex and the free tetraamide are soluble, but in which the nickelous halide and chromous halide are insoluble.

The novel compounds described and claimed herein have many unusual and unexpected properties which render them highly useful for numerous purposes. They are excellent complexing agents for heavy metal salts and other substances, and also have many other uses which will be apparent to those skilled in the art.

Examples of specific uses for the novel polyamides of the present invention include solvents, plasticizers for polymeric materials such as polyolefins, polyesters, polyurethanes, etc., agents to separate and prepare metal salts, etc. The metal complexes will have varied utility including use as oxidation catalyst, drying agent for paints, pigments, etc.

The foregoing detailed description and the following specific examples are for purposes of illustration only and are not intended as being limiting to the spirit or scope of the appended claims.

EXAMPLE I

This example illustrates the preparation of the tetraethylester of cis, cis, cis, cis-1,2,3,4-cyclopentanetetracarboxylic acid.

In a 5 liter flask were placed 492 grams (2.0 moles) of cis, cis, cis, cis-1,2,3,4-cyclopentanetetracarboxylic acid, 960 g. of 95% 23 ethanol (19.8 moles), 2500 cc. of dry benzene and 20 cc. of concentrated sulfuric acid. The mixture was heated to reflux temperature and the ternary azeotrope of water, alcohol and benzene which boiled at 65° C. was collected until the distillation temperature reached 67° C. The last-mentioned temperature is within the boiling range of the binary azeotrope of benzene and ethanol.

The reaction mixture was washed with a 5% by weight solution of sodium bicarbonate in water and then given water washes. The solvent content of the washed reaction mixture was removed by distillation in vacuo. Since the reaction product thus isolated still contained some unesterified carboxy groups, it was dissolved in n-pentane and washed free of organic acids with 1 Normal aqueous sodium hydroxide followed by water washing. Evaporation of solvents and distillation of the resulting purified product under reduced pressure (120–5° C. at 45–50 microns) yielded 340 grams of the tetraester of cis, cis, cis, cis-1,2,3,4-cyclopentanetetracarboxylic acid having an acid number of 1.5 and a saponification number of 61.0 (theory 62.5).

EXAMPLE II

The following procedures A–E illustrate the preparation of the tetradimethylamide of cis, cis, cis, cis-1,2,3,4-cyclopentanetetracarboxylic acid (N,N,N',N',N'',N'',N''',N'''-octamethyl-cis, cis, cis, cis-1,2,3,4-cyclopentanetetracarboxyamide).

(A) Into a high presure autoclave are charged 35.8 grams (0.10 mole) of the tetraethylester of cis, cis, cis, cis-1,2,3,4-cyclopentanetetracarboxylic acid and 180 grams of a 25% solution of dimethylamine in water. The sealed reactor is heated to about 100–200° C. with agitation for a time sufficient to convert the tetraester to the tetraamide (e.g. 16 hours), then cooled, and the excess dimethylamine, water and ethyl alcohol removed in vacuo to yield a product consisting essentially of the tetra(dimethylamide) of cis, cis, cis, cis-1,2,3,4-cyclopentanetetracarboxylic acid.

(B) Into a reactor are placed 35.8 grams (0.10 mole) of the tetraethylester of cis, cis, cis, cis-1,2,3,4-cyclopentanetetracarboxylic acid, 45 grams (1.0 mole) anhydrous dimethylamine and 500 cc. of anhydrous dioxane. The mixture is heated to about 100° C. for about 16 hours. After cooling, the excess dimethylamine is flashed off and the dioxane is removed by distillation in vacuo to yield a product consisting essentially of the tetra(dimethylamide) of cis, cis, cis, cis-1,2,3,4-cyclopentanetetracarboxylic acid.

(C) The method of procedure B above is repeated except that in addition to the anhydrous dioxane, 124 grams of dry ethylene glycol are also added to catalyze the amination. The reaction proceeds very readily to produce the tetra(dimethylamide) of cis, cis, cis, cis-1,2,3,4-cyclopentanetetracarboxylic acid.

(D) The tetraethylester of cis, cis, cis, cis-1,2,3,4-cyclopentanetetracarboxylic acid is mixed in an autoclave with a large excess of dimethylformamide in the presence of a basic catalyst (sodium methoxide) at elevated temperature and under pressure until the tetraester is converted to the tetraamide. The product is recovered by distillation in vacuo to produce the tetra(dimethylamide) of cis, cis, cis, cis-1,2,3,4-cyclopentanetetracarboxylic acid.

(E) To 2.5 grams (0.01 mole) of cis, cis, cis, cis-1,2,3,4-cyclopentanetetracarboxylic acid in 10 cc. of n-heptane is added small portions of phosphorous pentachloride cautiously and while maintaining a reaction temperature of 25–35° C., until no reaction occurs upon adding additional phosphorus pentachloride. The mixture is allowed to stand overnight at room temperature, then is washed with ice water and the resulting heptane solution added slowly to 1.0 gram of dimethylamine dissolved in 25 cc. of benzene. When the reaction is complete, the dimethylamine hydrochloride is filtered off and the excess dimethylamine is removed by distillation. Evaporation of the residue yields the tetra(dimethylamide) of cis, cis, cis, cis-1,2,3,4-cyclopentanetetracarboxylic acid.

The tetra(dimethylamide) of cis, cis, cis, cis-1,2,3,4-cyclopentanetetracarboxylic acid has the following properties:

Appearance—Viscous golden brown liquid
Formula—$C_{17}H_{30}O_4N_4$
Molecular weight—354.5
Specific gravity—1.2
Refractive Index, $n_D^{28}$—1.50
Initial boiling temperature—140° C. at 0.05 mm. Hg
Acid number—8.71
Viscosity, cp.:
    0° C.—1,000,000,000 (extrapolated)
    28° C.—>100,000
    50° C.—3090
    75° C.—513
    100° C.—60
Solubility:
    In water—Infinite
    In benzene—Infinite
    n-Hexane—<1%

The foregoing procedures A–E may be used to prepare other desired tetraamide derivatives of cis, cis, cis, cis-1,2,3,4-cyclopentanetetracarboxylic acid by substituting other reagents for the dimethylamine or dimethylformamide, such as ammonium hydroxide and mono- or dialkyl amines or formamides having the desired number of carbon atoms.

EXAMPLE III

A quantity of the tetra(dimethylamide) of cis, cis, cis, cis-1,2,3,4-cyclopentanetetracarboxylic acid was warmed sufficiently to reduce the viscosity and allow ready flow and then individual portions were mixed with cobaltous chloride ($CoCl_2$) in molar ratios of the amide to cobaltous chloride of 1:4, 1:3, 1:2, 1:1, 2:1, 3:1, and 4:1. A blue solution was formed in each instance and the resultant cobalt complex of the amide was insoluble in benzene and toluene, whereas the amide alone is infinitely soluble in benzene. Treatment of the cobalt complex of the amide with chloroform destroyed the complex and the amide was dissolved in the chloroform leaving behind solid cobaltous chloride.

Chromous chloride ($CrCl_2$) and nickelous bromide ($NiBr_2$) were insoluble in the amide under the above conditions. Thus, it is possible to separate a solid mixture of cobaltous chloride, chromous chloride and nickelous bromide by treatment with the amide to dissolve only the cobaltous chloride, followed by separating the undissolved solid chromous chloride and nickelous bromide from the resulting solution. The solution of cobaltous chloride in the amide is then treated with chloroform to dissolve the amide and destroy the cobalt complex. The insoluble cobaltous chloride remains behind as a solid material which may be readily separated from the chloroform solution of the amide and recovered free of the chromous chloride and nickelous bromide as a purified product. The chloroform may be removed from the amide by distillation and the recovered amide may be recycled in the process to separate additional cobaltous chloride from the mixture.

EXAMPLE IV

A portion of the tetra(dimethylamide) of cis, cis, cis, cis-1,2,3,4-cyclopentanetetracarboxylic acid was mixed with elemental iodine. The iodine was very soluble in the amide and produced a dark yellow-brown color. The resultant iodine solution was soluble in benzene and washings from water extraction of the solution gave a positive test for free elemental iodine with starch indicator solution, as did the residue.

I claim as my invention:

1. A composition of matter comprising a tetracis amide having the formula

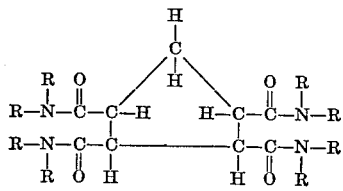

wherein R is an alkyl group containing 1–8 carbon atoms, a cycloalkyl group containing 3–20 carbon atoms, an alkyl substituted cycloalkyl in which the alkyl substituent contains 1–8 carbon atoms, an aryl or alkaryl group containing from 6–20 carbon atoms.

2. The tetracis dialkylamide of 1,2,3,4-cyclopentanetetracarboxylic acid in which the alkyl group contains from 1–8 carbon atoms.

3. The tetracis dimethylamide of 1,2,3,4-cyclopentanetetra-carboxylic acid.

4. A complex of cobaltous halide and a tetracis amide having the formula

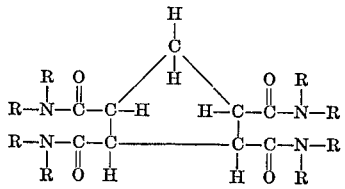

wherein R is an alkyl of 1–8 carbon atoms.

5. The cobalt halide complex of the tetracis (dimethylamide) of 1,2,3,4 - cyclopentane - tetra-carboxylic acid.

References Cited

UNITED STATES PATENTS 3,021,308   2/1962   Caywood et al. _____ 260—75

OTHER REFERENCES

Fynar, Organic Chemistry, Longmans, Green and Co. Ltd., London, 4th edition, part 1 (1961), p. 203.

Bernton et al. J. Chem. Soc. 1924, pp. 1492–7.

In gold et al., J. Chem. Soc., 1936, pp. 142–9 and p. 153.

Dwyer et al., Chelating agents and Metal Chelates, Academic Press, New York, N.Y., 1964, pp. 327–9.

TOBIAS E. LEVOW, Primary Examiner

A. P. DEMERS, Assistant Examiner

U.S. Cl. X.R.

23—87; 260—32.6, 514, 557